United States Patent [19]

Gonzalez

[11] 4,446,547

[45] May 1, 1984

[54] RECORD CLEANING DEVICE
[76] Inventor: Fernando Gonzalez, Burbank, Calif.
[21] Appl. No.: 339,843
[22] Filed: Jan. 18, 1982

Related U.S. Application Data

[63] Continuation of Ser. No. 196,620, Oct. 14, 1980, abandoned.

[51] Int. Cl.³ ............................................. G11B 3/58
[52] U.S. Cl. .................................................... 369/74
[58] Field of Search ................................. 369/74, 72

[56] References Cited

U.S. PATENT DOCUMENTS

| | | | |
|---|---|---|---|
| 1,712,637 | 5/1929 | Watson | 369/74 |
| 3,189,353 | 6/1965 | Grado | 369/74 |
| 4,131,284 | 12/1978 | Rangabe | 369/74 |

FOREIGN PATENT DOCUMENTS 434153  1/1912  France ................................ 369/74

*Primary Examiner*—Steven L. Stephan
*Attorney, Agent, or Firm*—Robert B. Block; Lewis Anten

[57] ABSTRACT

A record cleaning device which attaches to the tone arm of a record player for removing dust and other undesirable material from the grooves of a phonograph record without significant interferring with the normal tracking of the phonograph cartridge. The device includes a brush for brushing the undesirable material from the grooves of the phonograph record, and an elongated strip of thin, lightweight and flexible material for flexibly supporting the brush above and in contact with the grooves of the phonograph record in which the flexing action of the brush and that of the strip in relation to the brush weight allows for joint, commensurate and comparable flexing action of both during record playback. In a further embodiment a motion damper is mounted between the brush and the strip to stop energy exchange between them and to dampen feedback vibrations to the tone arm.

13 Claims, 4 Drawing Figures

RECORD CLEANING DEVICE

CROSS-REFERENCE TO RELATED APPLICATION

This application is a continuation of my application entitled "Record Cleaning Device", Ser. No. 196,620 filed Oct. 14, 1980 now abandoned.

BACKGROUND OF THE INVENTION

The present invention relates to record cleaning devices and, in particular, to record cleaning devices which attach to the tone arm of a record player.

Record cleaning devices which attach to the tone arm of the record player are known. Such devices obviate the need for a manual cleaning of the phonograph record and insure that the grooves of the phonograph record are cleaned immediately prior to the time when they are played. However, these prior art record cleaning devices add excessive weight and/or inertia to the tone arm thus causing undesirable interference with the normal delicate tracking of the phonograph cartridge. In addition, because of the rigid interconnection of the brush to the tone arm, the playing of a warped record may cause the needle of the cartridge to lift from the surface of the playing record.

One attempt to eliminate some of the disadvantages present in the prior art record cleaing devices calls for a freely rotatable pivot joint to be placed in the arm which links the cleaning brush to the tone arm. This permits the cleaning brush to pivot about a horizontal axis which helps to decouple it from the tone arm. However, such a structure does not alleviate the inertial problems associated with a large mass attached to the tone arm. Moreover, because the cleaning brush can freely pivot about a horizontal axis, it is possible for it to collapse while a record is being cleaned, i.e., to pivot inwardly so much that the brush no longer rests in a vertical plane. This not only diminishes the effectiveness of the cleaning brush, but also may cause the needle of the cartridge to momentarily lift from the surface of the record while it is being played.

SUMMARY OF THE INVENTION

It is therefore a primary object of the present invention to eliminate these and other problems in the prior art record cleaning devices.

It is a further object of the present invention to provide a record cleaning device which attaches to the tone arm of a record player and which is light in weight and not susceptible to accidental pivoting while cleaning a record.

It is a further object of the present invention to provide a record cleaning device which attaches to the tone arm of a record player and which does not significantly interfere with the normal tracking of the phonograph cartridge.

It is a further object of the present invention to provide a record cleaning device which attaches to the tone arm of a record player and which does not cause the needle of the tone arm to lift when played warped records.

It is a further object of the present invention to provide a record cleaning device which attaches to the tone arm of a record player and which is light in weight, inexpensive to manufacture, easy to install, and simple to use.

These and still further objects of the present invention are accomplished by attaching a record cleaning brush to the tone arm of a record player by an elongated strip of thin, lightweight and flexible material. In the preferred embodiment of the present invention, the elongated strip is made of plastic and attached to the tone arm by a piece of flattened stryrofoam having adhesive material attached to both sides thereof. The end of the elongated strip which supports the cleaning brush is designed to permit the height of the brush to be adjusted relative to the phonograph cartridge. The brush flexibility and the strip flexibility are roughly matched so that both cooperate in allowing the brush to ride up and down relative to the height of the needle, the brush deflection away from the direction to which it points, namely normal to the record, and the deflection of the strip vertically in line with the normal to the record being approximately equal. For maximum weight and vibration isolation, a motion damper is inserted along the length of the shaft of the record cleaning brush to decouple the brush from the strip and prevent energy exchange between them and to the record cartridge.

DESCRIPTION OF THE PREFERRED EMBODIMENT

Figure 1:
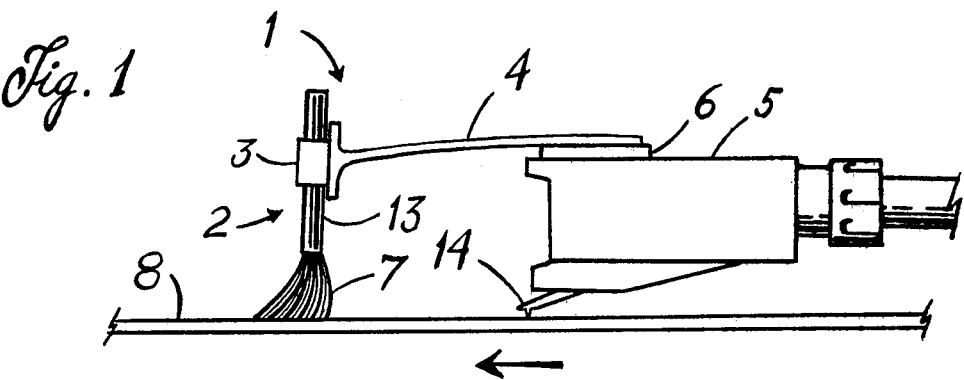
FIG. 1 illustrates a side view of the preferred embodiment of the present invention mounted on the tone arm of a record player and operating to clean the grooves of a moving record.
Figure 2:
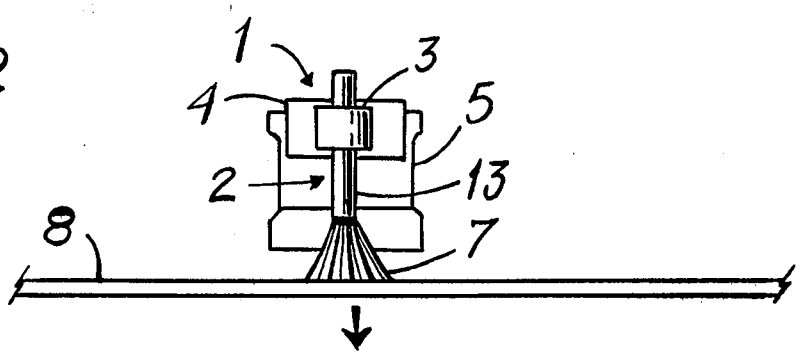
FIG. 2 illustrates a front view of the preferred embodiment of the present invention mounted on the tone arm of a record player and operating to clean the grooves of a moving record.
Figure 3:
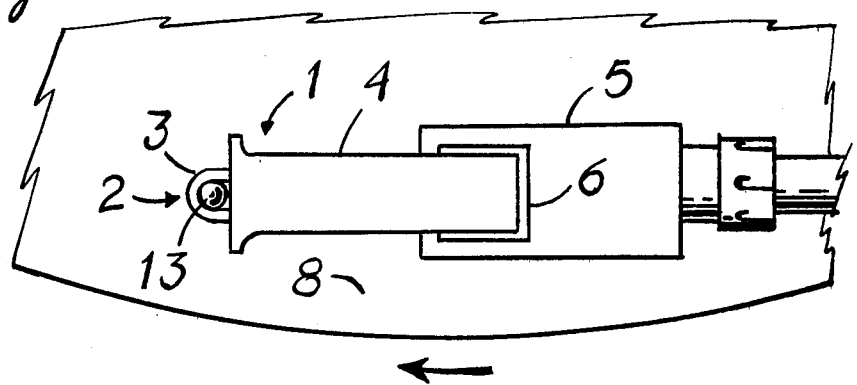
FIG. 3 illustrates a top view of the preferred embodiment of the present invention mounted on the tone arm of a record player and operating to clean the grooves of a moving record.

FIGS. 1, 2 and 3 illustrate, respectively, the side, front, and top view of the preferred embodiment of the present invention mounted on the tone arm of a record player and operating to clean the grooves of a moving record. As shown in FIG. 1, record cleaning device 1 comprises record cleaning brush 2 connected by socket 3 and elongated strip 4 to tone arm 5 of the record player (not shown).

To attach elongated strip 4 to tone arm 5, vibration absorbing material 6 such as styrofoam is inserted between elongated strip 4 and the top of tone arm 5 and provided with adhesive material attached to both sides thereof. Although adhesive material is preferred (not shown), screws may alternatively be used to fasten elongated strip 4 to tone arm 5. In addition to insuring secure attachment of record cleaning device 1 to tone arm 5, flattened styrofoam material 6 minimizes the transference of high frequency vibrations from record cleaning device 1 to tone arm 5.

Record cleaning brush 2 includes a plurality of bristles 7 grouped and attached at its upper end to shaft 13 which is preferably made of plastic. Although bristles 7 can be any of numerous types of material, including plastic, preferably, bristles 7 are made from camel hair, material which is very light in weight.

Instead of bristles, record cleaning brush 2 may utilize a fixed or rotatable cleaning pad made of cloth or other similar material (not shown). The use of bristles, however, is preferred as they provide extra spring-action to further aid in the isolation of the record cleaning brush from the tone arm.

It is very important that elongated strip 4 be made of a material which is thin, lightweight and flexible. While it is believed that many materials are well suited for this purpose, including spring steel, applicant chooses to use plastic in his preferred embodiment.

The flexibility of elongated strip 4 will depend upon numerous factors including its material composition, its thickness, its width, and its length. Ideally, the material should be sufficiently flexible to effectuate weight and vibration isolation between record cleaning brush 2 and tone arm 5 yet sufficiently rigid to insure that record cleaning brush 2 does not deviate appreciably from its vertical posture during the playing of a record.

The width of elongated strip 4 is also independently an important factor. While it should be as narrow as possible to minimize the total weight of record cleaning device 1, it should be wide enough to insure that record cleaning brush 2 is not able to appreciably twist about the axis parallel to the length of elongated strip 4. Such twisting is highly undesirable as it will adversely affect the delicate tracking of tone arm 5.

To minimize the amount of tracking interference caused by record cleaning device 1, the lower end of bristles 7 should be at approximately the same horizontal level as needle 14 of tone arm 5 with elongated strip 4 in an unflexed condition. To permit record cleaning device 1 to be used with tone arms of different height, therefore, means must be provided to permit relative adjustment of record cleaning brush 2 with respect to flexible, elongated strip 4. To facilitate this adjustment, an opening in socket 3 (see FIG. 3) is provided in which record cleaning brush 2 is inserted. This opening should be slightly smaller in diameter than the diameter of shaft 13. This will result in record cleaning brush 2 being securely retained within socket 3 without the need for additional fastening means while simultaneously permitting manual adjustment of the position of record cleaning brush 2 within socket 3.

Figure 4:
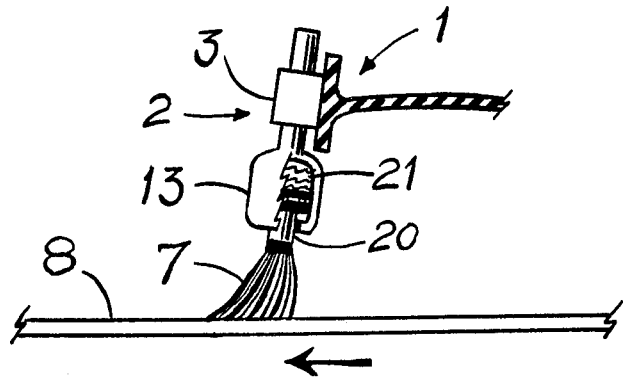
FIG. 4 illustrates the record cleaning brush of the preferred embodiment of the present invention having a motion damper mounted in line with its shaft and between the brush and the mounting strip to decouple the same.

To effectuate maximum isolation between record cleaning brush 2 and tone arm 5, motion damper 20 is inserted along the length of shaft 13 as shown in FIG. 4 in accordance with well-known damper mounting techniques. Motion damper 20 may be of the fluidic type in which case damping fluid 21 is included, or may be of any of the other well-known types. The motion damper serves to decouple the flexing of the bristles from the flexing of the strip.

The strip flexibility and the bristles are made roughly comparable so that the horizontal flexing of the bristles in the direction of motion of the record surface and the vertical flexing of the strip in line with the normal to the surface, both act simultaneously over an appreciable range during operation of the invention. Adjustment of the brush height is straight forward. The brush is lowered relative to the needle until it touches the grooves when the tone arm is at rest. It is then preferably lowered additionally until the strip is brought into partially raised position from a position wherein it supports the brush in a cantilevered manner over the record. And, the vertical combined movement caused by straightening of the bristles and flexing of the strip is adjustable to follow the warp of the records in question. This need not be enough to straighten up the strip to a perfectly horizontal position so that some droop will still be observed. Generally, a thin plastic strip of about one inch length and of about 0.005 inches to 0.010 inches thick and about 0.4 inches width is satisfactory to secure the above functions and to prevent twist about an elongate axis parallel to the plane of the record. And, to prevent yawing toward or away from the center of rotation of the record. If the strip is too flexible, the brush collapses, particularly if made of a soft pliable material such as camel hair. If the strip is too stiff, the brush does all the flexing. These extremes are easily avoided and are quite visible, the selection of the brush stiffness and strip overall flexibility being such that both do an equal amount of work approximately. That is to say, the flexing of each is made comparable during playing of a record of average warp.

By way of example, a brush and brush support record cleaning was made in accordance with the present invention and had the following dimensions and material characteristics.

Brush, camel's hair.
Length of bristle, about ¼".
Deflection, about 5°–10° to vertical and to accommodate about 1/20" to 1/10" vertical change.
Mounting strip, plastic or metal.
Length, about 1".
Width, ¼" to ½".
Metal thickness, 0.006" to 0.010" metal.
Plastic composition, any solid, flexible rubberlike plastic (vinyl).

The strip droops toward or away from the record about 5° but still sufficient to accommodate brush deflection. The brush, when adjusted as above, caused inconsequential force at the record cartridge and stylus so that the manufacturer's original recommended high tracking force could be used.

Although the brush is shown directly in front of the needle in FIG. 3, it will be appreciated to those skilled in the art that it will in practice be canted somewhat to a position leading the needle.

Although a preferred embodiment of the present invention has been disclosed, it is understood that the scope of the protection which is claimed is delineated solely by the following claims and all equivalent variations thereof.

I claim:

1. Record cleaning apparatus comprising brush means for brushing undesirable material from the grooves of a phonograph record and having a predetermined flexibility when brought into contact with the record surface and suspension means for mounting said brush means to come in contact with the grooves of a phonograph record and pointed in a direction generally normal to its surface; said suspension means comprising an elongated strip of thin, lightweight and flexible material, brush attachment means for attaching said brush means to one end of said elongated strip, and strip attachment means for attaching the other end of said elongated strip to the tone arm of a record player with the strip extending lengthwise beyond the end of the tone arm in a direction in alignment with a tangent to the record grooves so that the brush is held outwardly from and beyond the arm, whereat it is supported solely by said strip, said strip and said attachment means being constructed and arranged so that the flat sides of the strip are horizontal and the width of the strip are transverse to the record grooves and tone arm, said strip having a comparable flexibility to the brush so that the deflection of the brush at the record surface and the deflection of the strip respond in comparable manner so as to exchange deflection with each other in accommodation of record warp.

2. The record cleaning apparatus as in claim 1 further including paragraph (4) a vibration damper attached between the strip and the tone arm.

3. The apparatus of claim 1 wherein said brush means comprises a plurality of camel hairs.

4. The apparatus of claim 1 wherein said elongated strip is made of solid plastic.

5. The apparatus of claim 1 wherein said brush attachment means includes adjustment means for permitting the position of said brush means to be varied in elevation relative to said elongated strip.

6. The apparatus of claim 1 wherein said brush attachment means includes a shaft having a motion damper mounted in line therewith to at least partially decouple the flexing action of the brush from that of the strip.

7. The apparatus of claim 1 wherein said elongated strip is sufficiently wide to prevent appreciable rotational twisting of said brush means during record playing along axe parallel to the record.

8. The apparatus of claim 1 wherein the flexibility of said elongated strip is sufficient to substantially isolate the tone arm from vibrations of said brush means but not so great as to prevent said brush means to appreciably yaw or twist along the axis tangent to the arc swept by the tone arm during playing of a record.

9. The apparatus of claim 1 wherein said attachment means includes a piece of vibration absorbing material to serve to decouple the movements of the brush and support system from the tone arm.

10. The apparatus of claim 1 wherein flexibility of said elongated strip is sufficient to substantially isolate the tone arm from vibrations from said brush means but not so great as to prevent said brush means from appreciably moving up and down about the axis tangent to the arc swept by the arm during the playing of the record, and wherein said elongated strip is sufficiently wide so as to prevent the appreciable rotational twisting of the brush means along the axis parallel to the length of said elongated strip, said width being also sufficient to prevent yawing of the brush during playback.

11. A record cleaning apparatus comprising:
(a) a record cleaning brush having a plurality of bristles at one end thereof attached to a shaft;
(b) suspension means attached to said shaft for causing the bristles of said brush to come in contact with the grooves of a phonograph record, said suspension means comprising:
 (1) an elongated strip of thin, lightweight and flexible material; and
 (2) brush attachment means for attaching said shaft to one end of said elongated strip; and
 (3) strip attachment means for attaching the other end of said elongated strip to the tone arm of a record player so that the strip extends axially beyond and in alignment with the tone arm said strip attachment means including a piece of vibration absorbing material; and
 (4) said brush attachment means including adjustment means for permitting the position of said shaft to be varied relative to said elongated strip until the brush deflection and strip deflection resulting from playing warpped records is about equal.

12. The apparatus of claim 11 wherein the flexibility of said elongated strip is sufficient to substantially isolate the tone arm from vibrations of said brush means but not so great as to prevent said brush means to appreciably move about the axis tangent to the arc swept by the arm during playing of a record, and wherein said elongated strip is sufficiently wide to prevent appreciable rotational twisting of said brush means during record playing along the axis parallel to the length of said elongated strip.

13. The apparatus of claim 12 further including a motion damper mounted in line with said shaft to decouple the brush motion from that of the strip.

* * * * *